June 4, 1929.　　　　J. L. McCOY　　　　1,715,666
SUPERVISORY CONTROL SYSTEM
Filed March 1, 1924　　　8 Sheets-Sheet 1
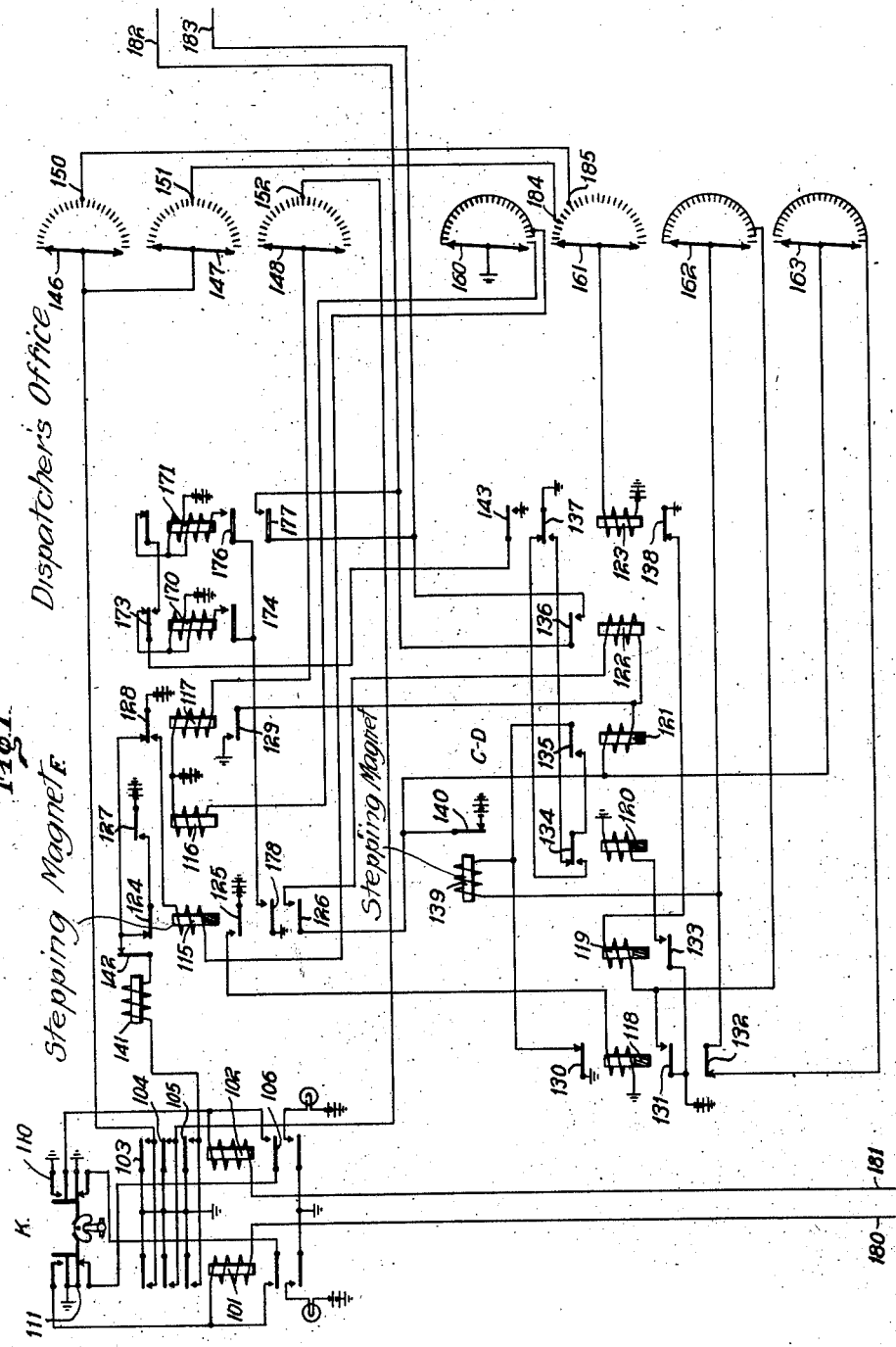
WITNESSES:
INVENTOR
James L. McCoy.
BY
Wesley G. Carr
ATTORNEY June 4, 1929.   J. L. McCOY   1,715,666
SUPERVISORY CONTROL SYSTEM
Filed March 1, 1924   8 Sheets-Sheet 2
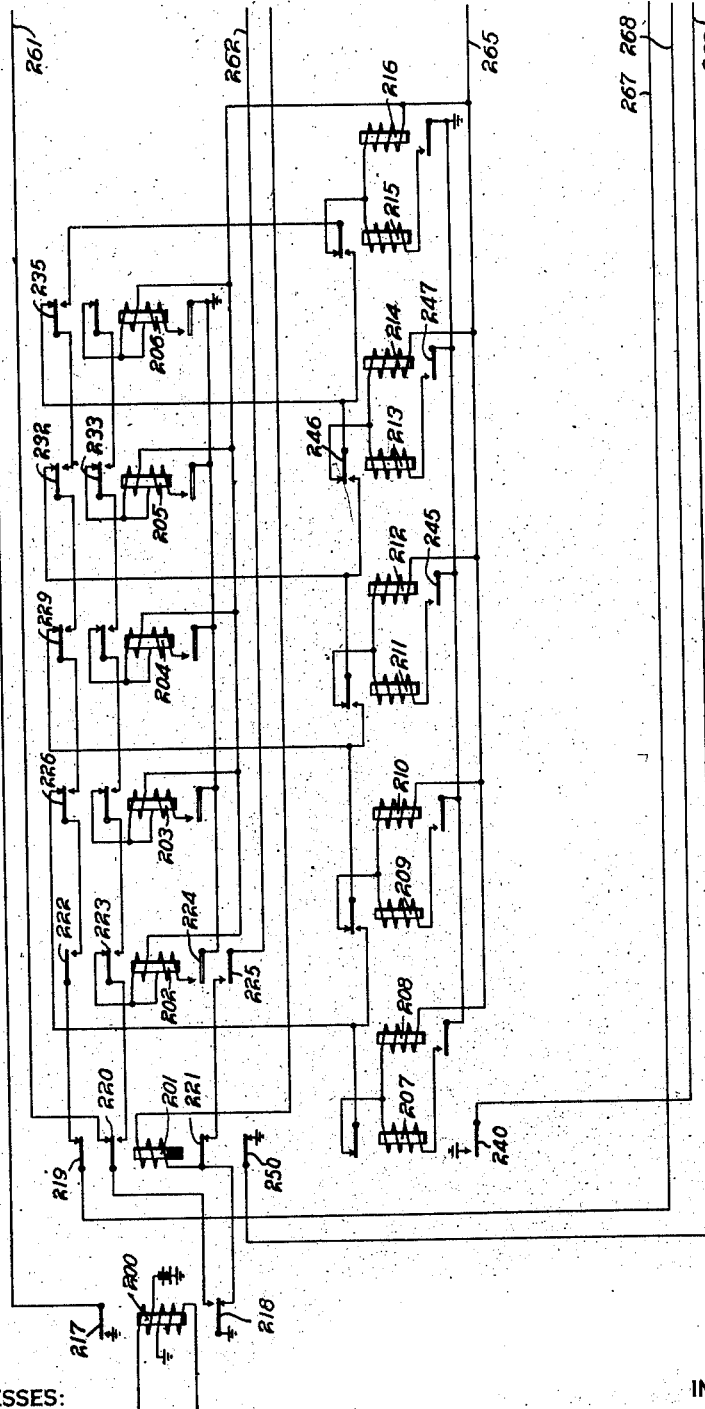

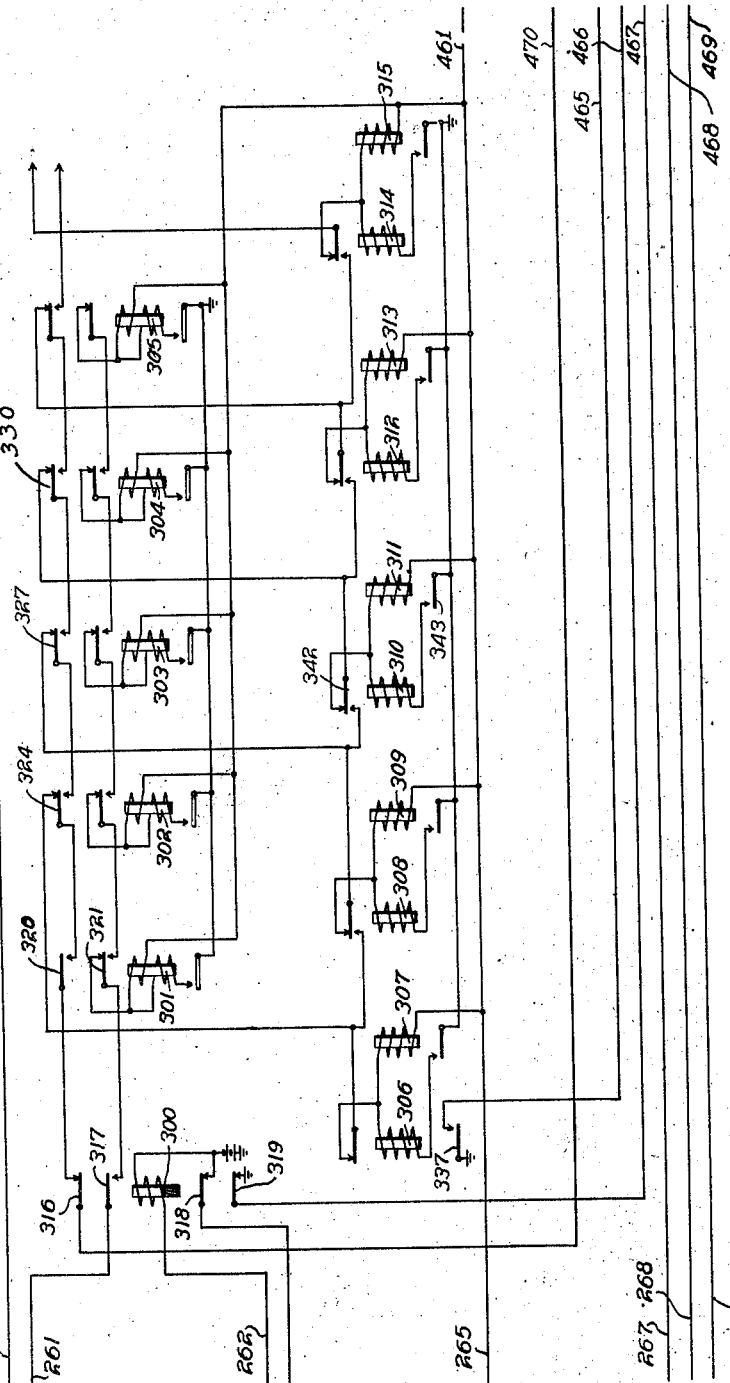

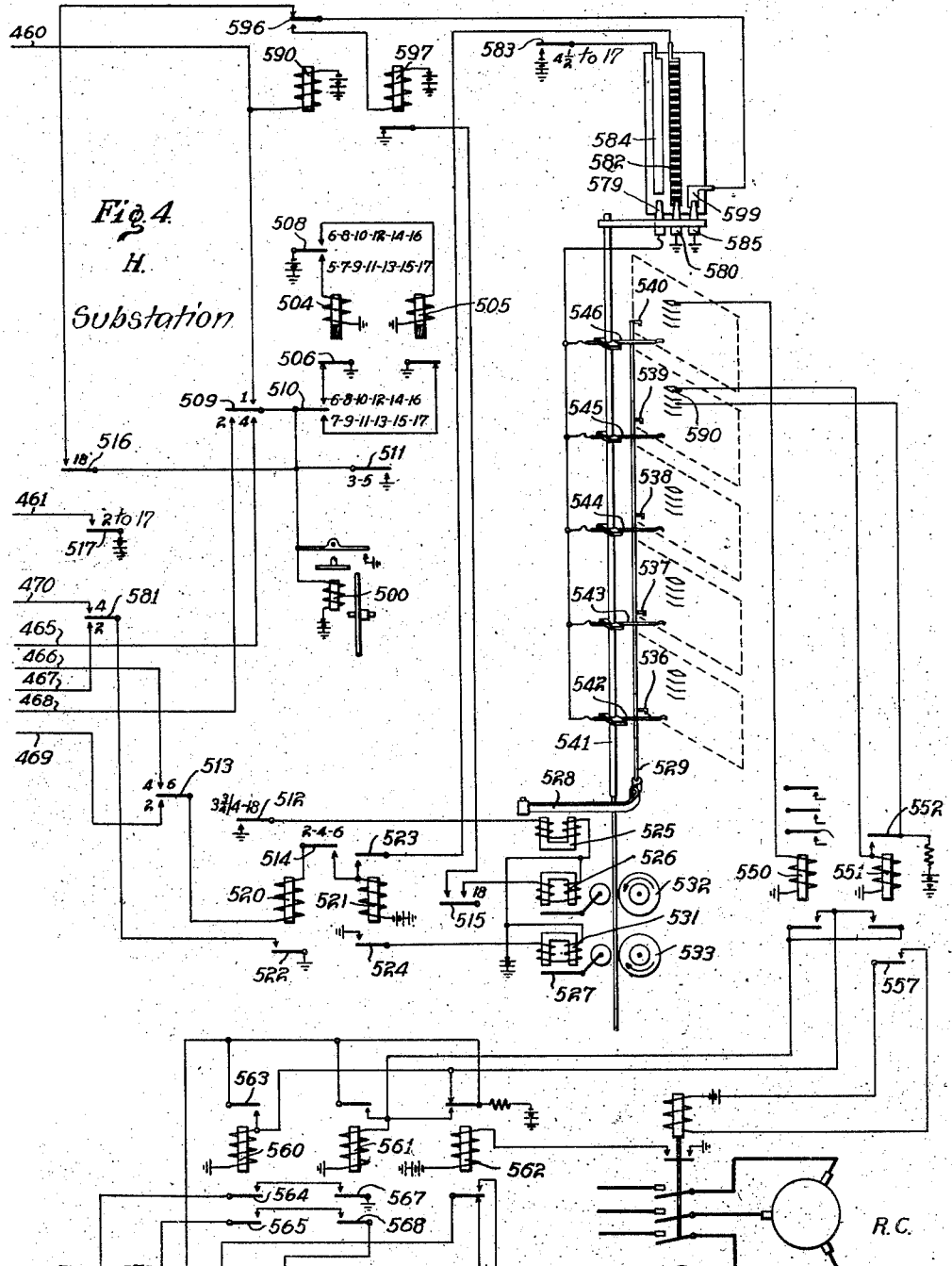

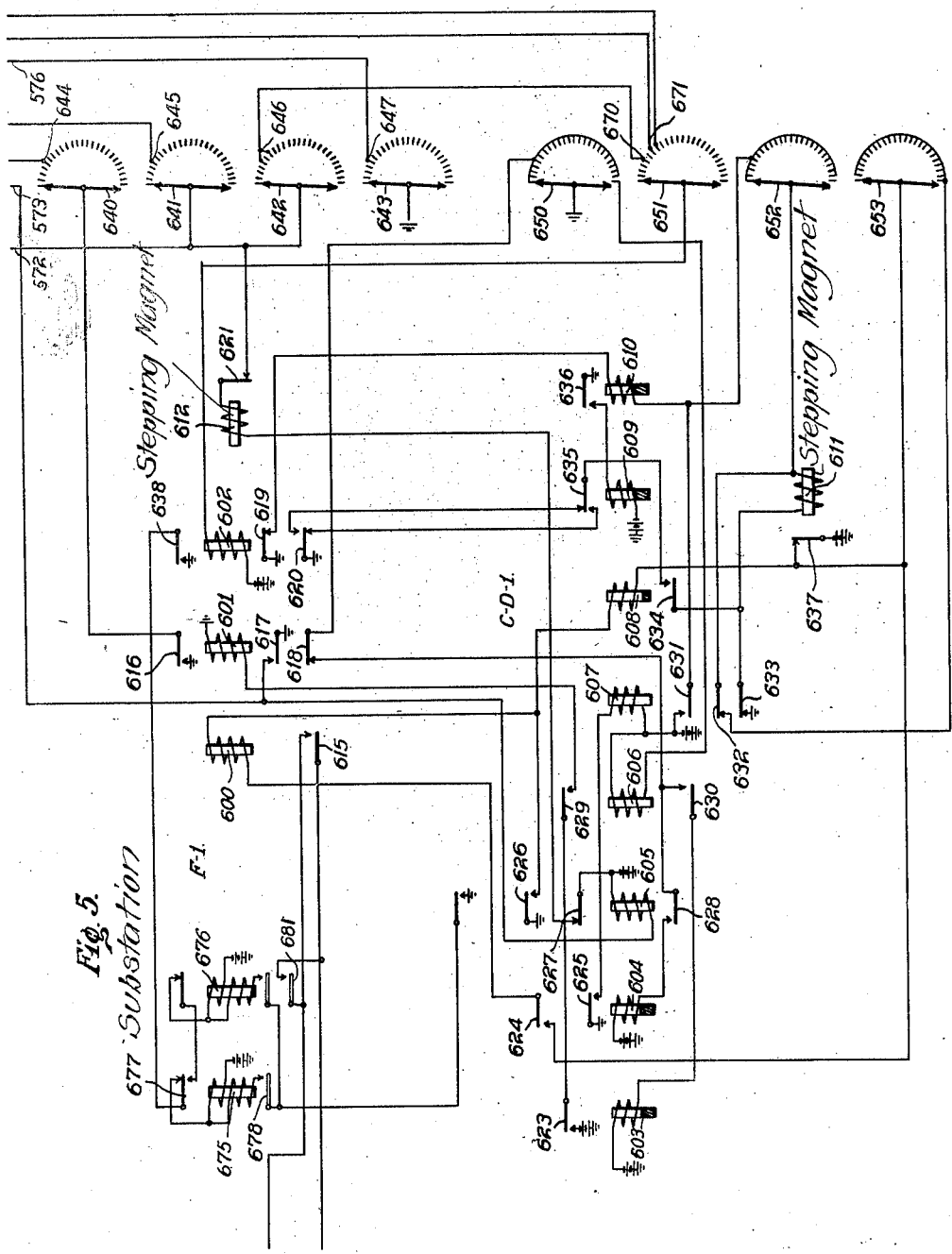

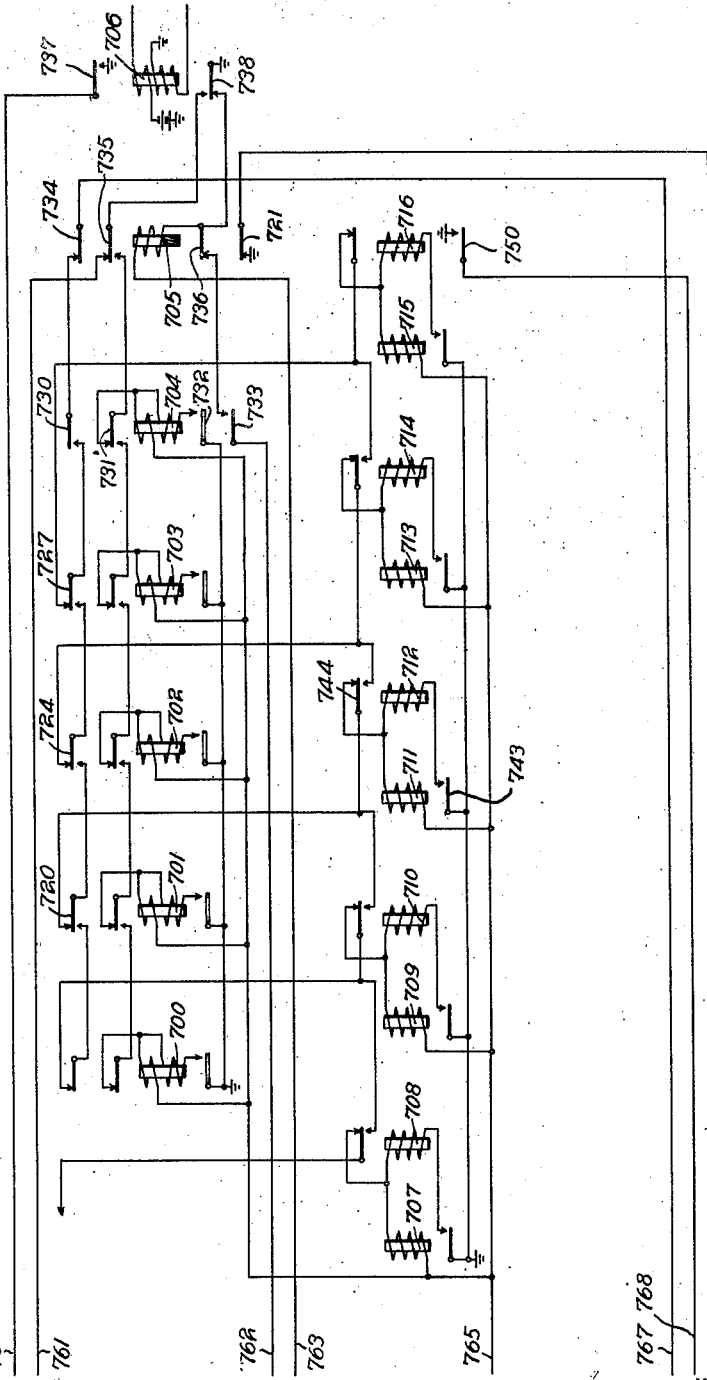
Fig. 6. Dispatcher's Office

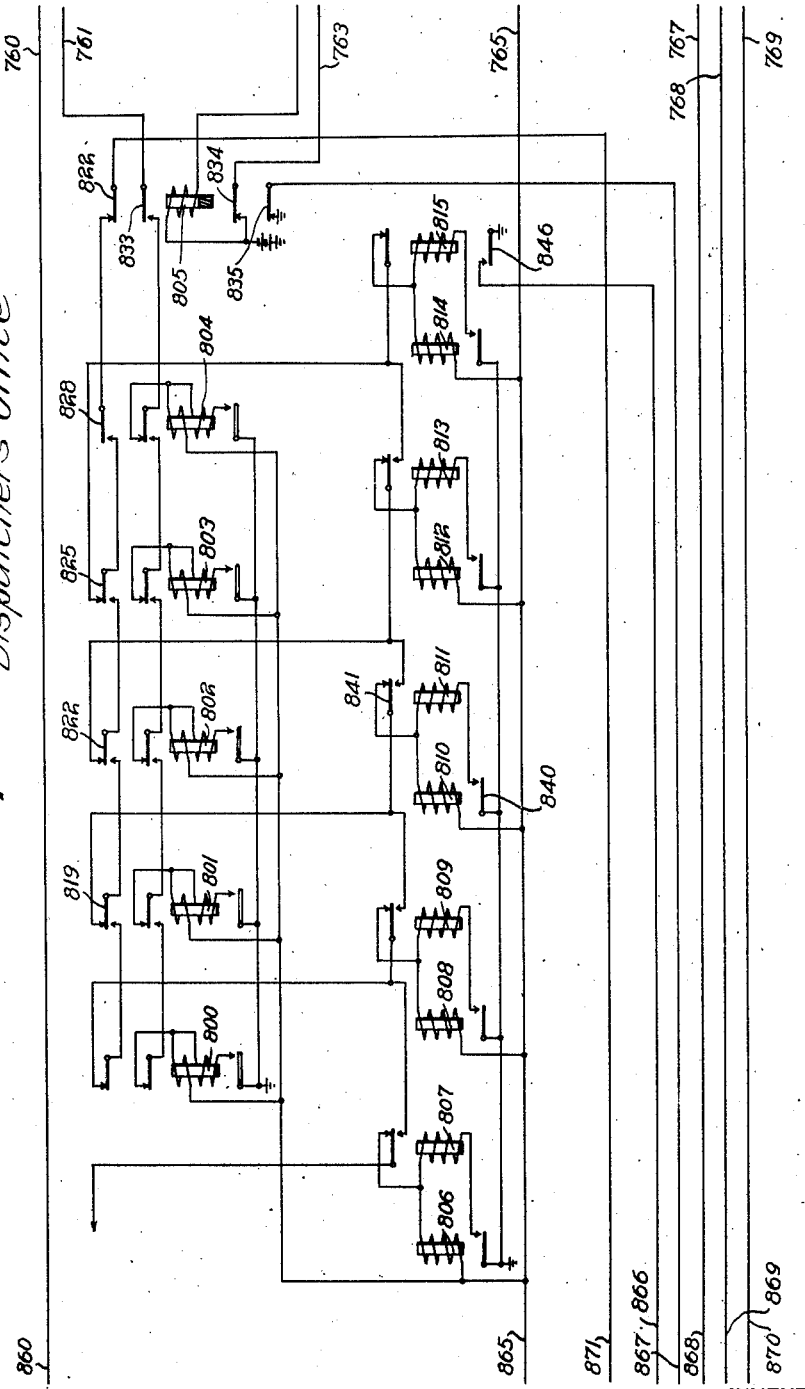

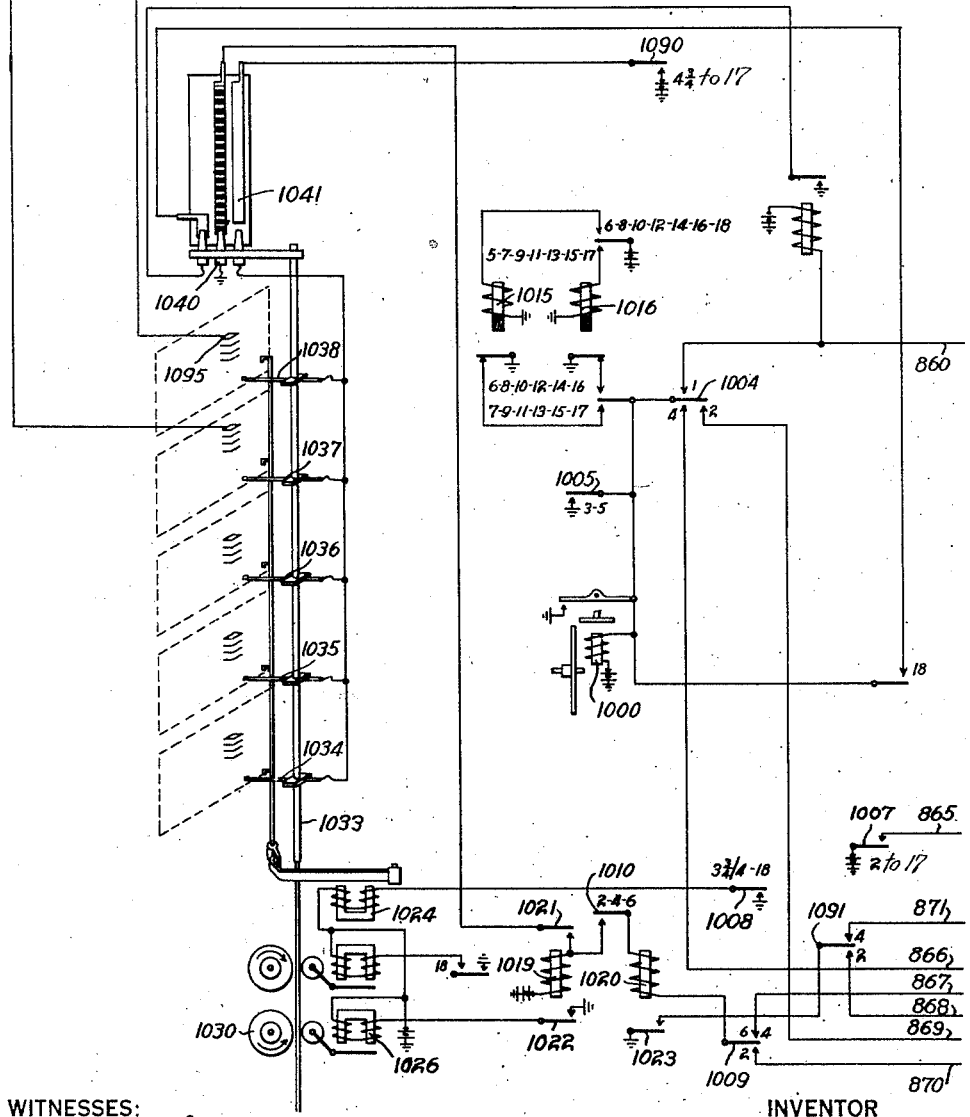

Patented June 4, 1929.

1,715,666

UNITED STATES PATENT OFFICE.

JAMES L. McCOY, OF WILKINSBURG, PENNSYLVANIA, ASSIGNOR TO WESTINGHOUSE ELECTRIC & MANUFACTURING COMPANY, A CORPORATION OF PENNSYLVANIA.

SUPERVISORY CONTROL SYSTEM.

Application filed March 1, 1924. Serial No. 696,180.

My invention relates to supervisory control systems and particularly to systems for supervising and controlling remotely-disposed power apparatus from a central point.

One object of my invention is to provide apparatus for supervising and controlling a large number of power units located in a substation of an electrical system of distribution from a load dispatcher's office.

Another object of my invention is to provide electrical switching mechanism for a system of the above-indicated character that shall be more rapid and positive than that heretofore used.

Still another object of my invention is to so arrange the circuits of a switching mechanism that the controlling impulses from the dispatcher's office or the substation, as the case may be, are recorded upon a plurality of quick operating devices which, in turn, control the movement of the switching mechanism proper. This arrangement enables the switching mechanism to operate at a high speed under local control.

There are other objects of the invention which, together with the foregoing, will be described in the detailed specification which is to follow.

Referring now to the drawings, comprising Figures 1 to 8, inclusive, these drawings, when placed side by side with the corresponding lines at the ends thereof in alinement, show my invention arranged for controlling apparatus units in one substation from a central load dispatcher's office.

Figs. 1, 6, 7 and 8 show the apparatus in the dispatcher's office, while Figs. 2, 3, 4 and 5 show the apparatus in the substation.

Briefly, the operation of my device is as follows: The dispatcher is provided with a number of keys, one for each apparatus unit in the substation to be controlled. There is a trunk line comprising three conductors connecting the dispatcher's office with the substation. A code-sending switch is associated with one end of this trunk line, the operation of which is controlled by a finder switch. The finder switch assumes a position corresponding to one of the keys operated.

At the dispatcher's office, two groups of counting relays are provided. These relays control the movement of a connector switch of the panel type in selecting one of the apparatus units.

At the substation, there are provided a finder and a code-sending switch similar to those at the dispatcher's office. In addition, at the substation, there are two groups of counting relays for controlling the operation of a panel-type connector switch.

In order to control an apparatus unit, the dispatcher will operate the key associated therewith. By this operation, the finder switch assumes a certain position and the code-sending switch functions to send out a code of impulses to energize certain relays in two counting relay groups. The panel-type connector switch then functions, a certain brush of a plurality of brushes being selected and then that brush being operated into engagement with a certain bank contact under the control of the operated relays. At the termination of this operation, the desired apparatus unit is operated.

As a result of this action, the finder switch in the substation causes the code sender to send out a certain code of impulses whereby certain relays in the three counting relay groups at the dispatcher's office are operated. The panel-type connector switch at the dispatcher's office then operates under the control of the operated relays to select the supervisory signal corresponding to the apparatus unit operated. By the operation of this supervisory signal, the dispatcher is informed of the operation at the substation.

Referring now more particularly to Fig. 1, in the upper left-hand corner thereof is shown a key K, which is of the ordinary double-throw type common in telephone practice. A plurality of other keys are located at the dispatcher's office, one for each apparatus unit that it is desired to operate. A set of relays, such as 101 and 102, are associated with each key, such as K. These relays control the operation of a finder switch F. This finder switch is of the ordinary rotary type, having three wipers 146 to 148, inclusive, each of which is adapted to engage a contact bank comprising twenty-five contacts and to move in a forward direction only. The finder switch F has no normal position.

A code-sending switch CD is associated with the finder F as is also a switch of the ordinary rotary type, having four wipers 160 to 163, inclusive, each adapted to engage a set of bank contacts comprising twenty-five contacts. The circuits of the code-sending switch CD are so arranged that the switch has a normal position.

In Fig. 2, the relays 200 to 216, inclusive, are adapted to control the brush selection in the connector switch H, Fig. 4. The relays 300 to 315, inclusive, of Fig. 3, are adapted to control the final selecting movement of the selected brush of the connector switch H into engagement with the bank contact associated with the desired circuit breaker.

In Fig. 4, a connector H is shown. The connector H is provided with five brushes 542 to 546, inclusive, which are adapted to move in an up or a down direction under the control of the "up" or the "down" driving magnets 531 and 526. The magnet 525 is a trip magnet provided for selecting the proper one of the plurality of brushes. For controlling the circuits of the connector switch H, a sequence switch, of the usual type, is provided, the operation of which is controlled by a sequence switch magnet 500. The sequence switch contacts under the control of the sequence switch magnet 500 are indicated diagramatically at 508 to 517, inclusive, and 580 and 581. Relays, such as 550 and 551, are provided for the purpose of controlling circuit breakers or contactors, such as the contactor indicated diagrammatically at C. The contactor C, in conjunction with other apparatus of a well-known type (not shown), is adapted to control the operation of a rotary converter RC, or any other device. Relays 560 to 562, inclusive, are associated with the contactor C and are provided for the purpose of controlling the operation of a finder switch F—1, Fig. 5.

The finder switch F—1 is similar to the finder switch F, previously described. A code-sending switch CD—1 is associated with the finder switch F—1 and is similar to the code-sending switch CD previously described.

A detailed description of the panel type connector is found in "Automatic Telephony" by Aitkens, published by Ernest Benn London in 1923 on page 192, Figure 133. Figure 137, page 198, discloses the details of a sequence switch and Figures 65 and 66, page 75, and Figure 87, page 110, the details of a finder switch.

Relays 700 to 716, inclusive, Fig. 6, and relays 800 to 815, inclusive, Fig. 7, are operated by the code-sending switch CD—1 and, in turn, control the operation of a connector switch H—1, Fig. 8.

The connector switch H—1, Fig. 8, is similar to the connector switch H previously described.

Relays, such as 1050, are adapted to be selected and operated by the operation of the connector switch H—1. These relays control the energization and deenergization of relays, such as 1051, which control the operation of supervisory signalling lamps, such as 1054 and 1055.

The relays 202 to 206, inclusive, 301 to 305, inclusive, 700 to 704, inclusive, and 800 to 804, inclusive, are counting relays. These relays have two windings, the upper winding being of comparatively few ampere turns and capable of attracting only the armature which is shown in the form of a hollow rectangle. With both relay windings energized, all the armatures of the relay are operated.

Having described the apparatus shown in the drawings, in a general manner, I will now describe its detailed operation. For this purpose, it will be assumed that the dispatcher desires to operate the rotary converter RC at the dispatcher's office. In order to do this, the dispatcher will operate a key, which it will be assumed, is the key K, in the proper direction. It will be assumed, in this case, that the key K is operated in such a direction as to force a spring 110 into engagement with its working contact. By this operation, a circuit is closed extending from ground through the winding of relay 102, conductor 181, and front contact and armature 1053 to battery.

The relay 102 is energized over the above circuit and, upon operating, establishes a locking circuit for itself, at armature 106, extending from ground through the spring 111 of the key K, at armature 103 places ground upon wiper 146, at armature 104 places ground upon bank contact 152, and at armature 105 establishes a circuit extending from ground by way of said armature and its front contact, winding of stepping magnet 141 of finder switch F, armature 142 and its back contact, and back contact and armature 128 to battery.

As the stepping magnet 141 interrupts its own circuit at armature 142, the said magnet operates as a buzzer to advance the switch wipers 146 to 148, inclusive, until they are brought into engagement with the bank contact set comprising contacts 150 to 152, inclusive. When the switch wipers are brought into engagement with this set of bank contacts, a circuit is completed extending from ground by way of armature 104 and its front contact, bank contact 152, wiper 148, and winding of relay 117 to battery. The relay 117 is energized over the above circuit and operates to close a circuit over a path extending from ground by way of armature 129 and its front contact, winding of slow-releasing relay 121, and armature 140 and its back contact to battery, at armature 128 opens the circuit of the stepping magnet 142, and at the front contact of this armature closes a circuit extending from battery by way of armature 128 and its front contact, winding of slow-releasing relay 115, bank contact with which wiper 160 of the code-sending switch CD is in engagement, and the said wiper to ground. The slow-releasing relay 121, upon being energized, prepares a circuit, at armature 135, for the stepping magnet 139 of the code-sending switch CD. The slow-releasing relay 115, upon operating, at armature 124, opens one point in another circuit for the stepping magnet 141, at armature 125 closes a circuit for the slow-releasing relay 118, and closes a circuit for the repeating relay 122 at armature 126 over a path extending from battery by way of back contact and armature 140, armature 126 and its front contact, winding of the repeating relay 122, and front contact and armature 129 to ground. The relay 122 is operated over the above traced circuit and closes, at its armature 136, a circuit for the line relay 200 of the control relays at the substation.

The line relay 200 is energized over this circuit and operates, at armature 217, to complete a circuit extending from ground by way of the front contact and said armature, conductor 260, conductor 460, sequence switch contact 509 which is now in position 1, and winding of sequence magnet 500 to battery. The sequence switch magnet operates to move the sequence switch in a well known manner to its second position. The relay 590 is also energized over the above-traced circuit but its operation is without particular function at the present time.

Another result of the operation of the line relay 200 is that, at armature 218, the circuit of the slow-releasing relay 201 is momentarily broken and a circuit is completed extending from ground by way of the said armature and its front contact, armature 220 and its front contact, armature 223 and its back contact, upper winding of relay 202, conductor 265, conductor 461, and through the sequence switch contacts 517 which are closed from the second to the seventeenth position of the sequence switch to battery.

With the upper winding of the relay 202 energized, the armature 224 is attracted into engagement with its front contact. This is due to the construction of the relay windings and the adjustment of the relay springs previously described. As a result of the operation of the armature 224, a circuit is prepared for the lower winding of the relay 202 from ground over armature 224 and its front contact, the lower and upper winding of relay 202, and to battery over conductor 265 as traced above. However, this circuit is not effective, so long as the previously traced circuit for the upper winding is maintained owing to the ground at 218 for the battery at conductor 265 which is bipassing the circuit through the lower winding of relay 202.

As the operation of the line relay 200 is only momentary, by reason of the operation of the code-sending switch CD, the slow-releasing relay 201 is not deenergized.

At the dispatcher's office, the slow-releasing relay 118, upon being energized, operates to open one point in the circuit of the stepping magnet 139 at armature 130, to open another point in the circuit of the stepping magnet 139 at armature 132, and to close a circuit for the slow-releasing relay 119 at armature 131. The slow-releasing relay 119, upon operating, at armature 133 closes a circuit for the slow-releasing relay 120. The latter relay, upon operating, closes a circuit which extends from ground by way of armature 137 and its back contact, the front contact and armature 134, the front contact and armature 135, winding of stepping magnet 139, wiper 162, bank contact with which said wiper is in engagement, and front contact and armature 131 to battery. The stepping magnet 139 is energized over the above circuit and operates to position its associated pawl to actuate the switch shaft upon its deenergization and to open the circuit of the slow-releasing relay 121 and the circuit of the repeating relay 122 at armature 140. The relay 122, upon retracting its armature 136, opens the circuit of the line relay 200 at the substation.

The line relay 200 deenergizes to remove the short-circuit from the lower winding of the relay 202 and to close the circuit for the slow-releasing relay 201. The relay 202 immediately operates the armatures 222, 223 and 225. The operation of the armature 223 prepares a circuit for the upper winding of the relay 203. The operation of the armature 225 prepares a circuit for the slow-releasing relay 300. The operation of the armature 222 prepares a circuit for the relay 208.

Referring now to the operation of the code-sending switch CD, the slow-releasing relay 121 is deenergized after an interval and opens the circuit of the stepping magnet 139 at the armature 135. The magnet 139 thereupon is deenergized to advance the switch wipers 160 to 163, inclusive, one step and, at armature 140, closes a circuit for the repeating relay 122. The relay 121 energizes also and closes a circuit for the stepping magnet 139. This operation continues until the switch wipers are brought into engagement with the set of bank contacts which includes the contact 184. As a result of the operation of the switch wipers, a circuit is completed extending from ground by way of armature 103 and its front contact, the wiper 147, bank contact 151, bank contact 184, wiper 161, and winding of relay 123 to battery.

The relay 123 is energized over the above circuit and operates, at armature 137, to open the circuit of the stepping magnet 139, to prepare another circuit for the said magnet at the front contact of this armature, to open the circuit of the slow-releasing relay 119 at armature 138, and to close a circuit extending from ground by way of the front contact and armature 143, armature 173 and its back contact, and upper winding of relay 170 to battery.

The relay 170 is adapted to attract only the armature 174 with its upper winding energized, being of the same construction as the counting relays. As a result of the attraction of the armature 174, a circuit is prepared for the lower winding of the relay 170 from ground through battery, the upper and lower winding of relay 170, the front contact and armature 174 and the front contact and armature 178 to ground. However, this winding is not effective at the present time owing to ground at armature 143 which shunts the cover winding of relay 170. The slow-releasing relay 119 deenergizes after an interval of time to open the circuit of the slow-releasing relay 120 at armature 133. The latter relay is also deenergized, whereupon a circuit is completed extending from ground by way of armature 137 and its front contact, the back contact and armature 134, front contact and armature 135, winding of stepping magnet 139, wiper 162, back contact with which said wiper is in engagement, and front contact and armature 131 to battery. The stepping magnet 139 is energized over the above circuit to position its pawl and to open the circuit of the slow-acting relay 121, and also the circuit of the repeating relay 122.

The repeating relay 122 deenergizes to open the circuit of the line relay 200 at the substation. The slow-releasing relay 121 also deenergizes to open the circuit of the stepping magnet 139 which retracts its armature to actuate the switch shaft carrying the wipers 160 to 163, inclusive, one step, and also to complete a circuit for the slow-releasing relay 121 and the repeating relay 122.

By the operation of the switch wiper 161, the circuit of the relay 123 is opened and this relay retracts its armatures to open the circuit of the stepping magnet 139 at armature 137, to prepare the usual stepping circuit for this magnet at the back contact of this armature, to complete a circuit for the slow-releasing relay 119 at armature 138, and to remove the short-circuit from the lower winding of the relay 170 at armature 143. The relay 170 immediately operates to attract the armature 173, whereby a circuit is prepared for the upper winding of the relay 171.

The slow-releasing relay 119 operates to close the circuit of the slow-releasing relay 120. The latter relay, upon being energized, completes a circuit for the stepping magnet 139 over a path extending from ground by way of armature 137 and its back contact, front contact and armature 134, front contact and armature 135, winding of stepping magnet 139, wiper 162, bank contact with which said wiper is in engagement, the front contact and armature 131 to battery. The stepping magnet 139 operates, as before, to position its pawl and to open the circuit of the slow-releasing relay 121, and also the circuit of the repeating relay 122.

Referring now to the apparatus at the substation, during the period that the code-sending switch CD is operating to find the bank contact set, including the bank contact 184, four interruptions are produced in the circuit of the line relay 200. By the repeated deenergizations of this relay, relays 203, 204 and 205 are energized, relays 202, 203 and 204 being completely operated. When the pause occurs in the impulse by reason of the operation of the slow-releasing relays 119 and 120, the relay 200 at the substation is maintained energized, having completed a circuit for the upper winding of the counting relay 205. This pause in the impulsing is sufficiently long to enable the slow-releasing relay 201 to be deenergized. As a result of this operation, the circuit of the upper winding of the relay 205 is opened and the lower winding of the said relay is permitted to function, thereby attracting the armatures 232 and 233.

Another result of the deenergization of the relay 201 is that a circuit is completed extending from ground by way of back contact and armature 250, conductor 269, conductor 469, sequence switch 513 in the second position, through the winding of relay 520, sequence switch 514 which is closed in second position, and winding of relay 521 to battery. The relay 521 is energized over this circuit and operates, at armature 523, to prepare a locking circuit for itself, and at armature 524 closes a circuit for the up drive magnet 531. The up drive magnet operates to attract its armature 527, thereby forcing the shaft 541, carrying the brushes 542 to 546, inclusive, into engagement with the up drive roll 533. As a result of this operation, the shaft 541 is moved upward.

It will be seen that, as the shaft 541 carrying the brushes 542 to 546, inclusive, moves upward, the brush 580 is engaging the segments of the commutator 582. Thus, when the brush engages the first segment, a circuit is completed extending from ground by way of said brush, the first segment, armature 523 and its front contact, and winding of relay 521 to battery. Thus, this relay is locked energized until engagement is made with the insulated portion of the commutator, whereupon the circuit of the relay 521 is opened.

It will be noted that, when the relay 520 is first energized, a circuit is completed extending from ground by way of armature 522 and its front contact, sequence switch contact 581 in second position, conductor 467, conductor 267, armature 219 and its back contact, armature 222 and its front contact, armature 226 and its front contact, armature 229 and its front contact, armature 232 and its front contact, armature 235 and its back contact, armature 246 and its back contact, winding of relay 214, conductor 265, conductor 461, and sequence switch contact 517 to battery.

The relay 214 is energized over this circuit and operates to prepare a circuit for the relay 213 at armature 247 from ground through battery, the sequence switch 517, conductor 461, conductor 265, the windings of relays 214 and 213 in series to ground over armature 247. This last circuit is not effective so long as the original energizing circuit above traced for the relay 214 is maintained, by reason of the continued energization of the relay 520.

When the locking circuit of the relay 521 is completed by the movement of the brush 580, as above described, the relay 520 is shunted out and, consequently, deenergized. As a result of this operation, the previously traced short-circuit for the relay 213 is opened and this relay is energized in series with the relay 214. As a result of this operation, a circuit is prepared at armature 246 for the relay 212.

When the locking circuit of the relay 521 is opened, the relay 520 is again energized to complete a circuit for the relay 212 over the circuit traced above in connection with relay 214 except that it is now obviously completed over armature 246 and its front contact to the winding of relay 212. Relay 212 is energized and operates, at armature 245, to prepare a circuit for the relay 211. By the movement of the brush into engagement with the second commutator segment, the relay 520 is again short-circuited and the relay 211 is energized in series with the relay 212. By the operation of the relay 211, a circuit is prepared for the relay 210 which operates when the brush engages the next insulated segment in the commutator. This operation of the relay 520 and the relays such as 209, 208 and 207 continues.

The relay 207 is energized when the fourth segment of the commutator is engaged by the brush 580. As a result of the operation of the relay 207, the operating circuit of the relay 208 is opened.

When the relay 207 is energized, a circuit is completed extending from ground by way of armature 240 and its front contact, conductor 268, conductor 468, sequence switch 509, and sequence switch magnet 500 to battery.

The energization of the magnet 500 causes the sequence switch to turn from position 2 to position 3, whereupon it continues to operate under the control of the sequence switch contact 511 into position 4. As soon as the switch moves from position 2, the circuit of the relay 520 is opened at the sequence switch springs 513. The movement of the sequence switch 514 opens the circuit of the relay 521 and this relay is deenergized to open the circuit of the up drive magnet 531.

The sequence switch, in passing through position 3¾, operates the springs 512, whereby a circuit is completed for the tripping magnet 525. The operation of this magnet actuates an armature 528 that carries a shaft 529. The operation of the shaft 529 causes a certain one of the brushes 542 to 546, inclusive, to be so tripped that, upon the subsequent movement of the switch shaft, the brush set that is tripped will engage its associated bank contacts. In the present instance, it will be assumed that the brush 545 is the one selected and tripped.

The circuit of the tripping magnet 525 is, of course, opened as soon as the sequence switch rotates from position 3¾. The deenergization of this magnet serves to place the shaft 529, carrying the brush selecting mechanisms 536 to 540, inclusive, out of the path of the brushes. Upon stopping in position 4, a circuit is prepared for the relay 521 at the sequence switch contacts 514.

Returning now to the operation of the code-sending switch CD at the disptacher's office, the deenergization of the relay 122 serves to open the circuit of the line relay 200 at the substation, while the deenergization of the relay 121 opens the circuit of the stepping magnet 139 which is also deenergized. The retraction of the armature of the magnet serves to advance the switch wipers 160 to 163, inclusive, one step. Another result of the operation of the magnet 139 is that a circuit is completed for the slow-releasing relay 121 and the repeating relay 122. The repeating relay 122 operates, at armature 136, to complete a circuit for the line relay 200, while the energization of the relay 121 operates to complete the circuit of the stepping magnet 139.

The alternate operation of the magnet 139 and the relays 121 and 122 continues until the switch wipers 160 to 163, inclusive, are brought into engagement with the bank contact set which includes the bank contact 185. By this operation, a circuit is completed extending from ground by way of armature 103 and its front contact, wiper 146, bank contact 150, bank contact 185, wiper 161 and winding of relay 123 to battery. The relay 123 is energized over the above-traced circuit and operates, at armature 138, to open the circuit of the slow-releasing relay 119, at armature 137 operates to open the circuit of the magnet 139 and to prepare another circuit for the said magnet at the front contact of this armature, and at armature 143 to complete a circuit for the upper winding of the relay 171. The upper winding of the relay 171 causes the armatures 176 and 177 to be attracted, preparing a circuit for the lower winding of said relay and so short-circuiting the impulsing contacts 136 that the subsequent operation thereof will be ineffective for the present. The slow-releasing relay 119, upon being deenergized, opens the circuit of the slow-releasing relay 120, which is also deenergized.

As a result of the retraction of the armature 134 of the relay 120, the circuit of which is opened by the deenergization of the relay 119, a circuit is completed for the stepping magnet 139 which operates to open the circuit of the slow-releasing relay 121 and the repeating relay 122. The operation of the repeating relay 122 is without function at the present time, while the deenergization of the slow-releasing relay 121 opens the circuit of the stepping magnet 139. The retraction of the armature of the magnet 139 causes the switch wipers 160 to 163, inclusive, to be advanced into engagement with the next set of bank contacts, whereupon the circuit of the relay 123 is opened and this relay is deenergized to open the circuit of the stepping magnet at the front contact of armature 137 and to prepare, at the back contact of this armature, a circuit for the said magnet. The operation of the armature 138 again closes a circuit for the slow-releasing relay 119, while the retraction of the armature 143 removes the short-circuit from the lower winding of the relay 171 and permits this relay to completely operate.

By the operation of the repeating relay 122, during the second stepping movement of the code-sending switch, the line relay 200 at the substation is deenergized and energized three times. By the first operation of the armature 218, a circuit is completed extending from ground by way of said armature and its back contact, armature 221 and its back contact, front contact and armature 225, conductor 262 and winding of relay 300 to battery.

It is true that, at the same time that a circuit is completed for the slow-releasing relay 300, one is completed for the relay 201. However, the adjustment between these relays is such that the relay 300 is adapted to energize before the relay 201. Upon being energized, the relay 300, at armature 318, opens the circuit of the relay 201 in order that this relay is not operated, at armature 319 opens one point in the circuit of the relay 521, and at armature 317 prepares a circuit for the upper winding of the relay 301.

Upon the energization of the line relay 200, a circuit is completed extending from ground by way of the armature 218 and its front contact, armature 220 and its back contact, conductor 261, armature 317 and its front contact, armature 321 and its back contact, through the upper winding of relay 301, conductor 461 and sequence switch contacts 517 to battery. The energization of the upper winding of the relay 301 prepares a circuit for the lower winding of said relay. Upon the deenergization of the relay 200, the short-circuit is removed from the lower winding of relay 301 and this relay is permitted to completely energize, whereby circuits are prepared for the relays 306 and 307 and for the upper winding of the relay 302 at armatures 320 and 321, respectively.

The following operations of the line relay 200, previously described, cause the complete operation of the relay 302 and the energization of the upper winding of the relay 303.

With the upper winding of the relay 303 energized, a pause in the impulsing occurs, as determined by the operation of the slow-releasing relays 119 and 120 in the code-sending switch CD. By this operation, the line relay 200 remains energized and the slow-releasing relay 300 is deenergized. The deenergization of the relay 300 removes the short-circuit from the lower winding of the relay 303, and this relay is completely operated.

By the retraction of the armature 319 of the slow-acting relay 300, a circuit is completed extending from ground by way of back contact and said armature, conductor 466, sequence switch contact 513 in its fourth position, winding of relay 520, sequence switch contact 514 in position 4, and winding of relay 521 to battery. The relays 520 and 521 are energized over the above circuit. The relay 521, upon being energized, completes a circuit for the up-drive magnet 531. The up-drive magnet 531 operates to start the "up" drive of the switch shaft 541, thereby raising the brush 545 into engagement with the various bank contacts.

The operation of the relay 520 completes a circuit extending from ground by way of armature 522 and its front contact, sequence switch contact 581, conductor 470, armature 316 and its back contact, armature 320 and its front contact, armature 324 and its front contact, armature 327 and its front contact, armature 330 and its back contact, armature 342 and its back contact, winding of relay 311, conductor 461 and sequence switch contact 517 to battery. The relay 311 is energized over the above-traced circuit and prepares a circuit for the relay 310 at armature 343.

During the upward movement of the switch shaft, when the switch wiper 545 is brought to a position opposite to that of the first bank contact, a circuit is completed extending from ground by way of brush 580, commutator segment, armature 523 and its front contact and winding of relay 521 to battery. This operation serves to short-circuit the relay 520, which deenergizes to open the previously traced circuit for the relay 311. This operation also removes the short-circuit from the relay 310, which immediately operates to prepare a circuit for the relay 309.

Upon further movement of the switch shaft, the short-circuit is removed from the relay 520 and this relay is permitted to energize, whereby the relay 309 is operated. When the relay 520 is again deenergized, the relay 308 is operated. The upward movement of the switch shaft continues in this manner and the relay 520 is intermittently energized and deenergized, and the relays 307 and 306 are operated.

Upon the operation of the relay 306, a circuit is completed extending from ground by way of armature 337 and its front contact, conductor 465, sequence switch contact 509 in position 4 and winding of sequence switch magnet 500 to battery. The sequence switch now moves from position 4 to position 5 and, under the control of the master contact 511, into position 6.

When the sequence switch moves from position 4, the original circuit of the relay 521 is opened at the sequence switch contact 514, and this relay is deenergized to open, its locking circuit being opened by the movement of the switch shaft into engagement with the next commutator segment of the commutator 582. The deenergization of this relay by opening the energizing circuit of the up-drive magnet 531 at armature 524 brings about the termination of the upward movement of the switch shaft.

While the sequence switch is in position 4½, a circuit is closed extending from battery by way of sequence switch contact 583, commutator switch contact 584, commutator brush 579, wiper 545, bank contact 590 and winding of relay 551 to ground. The above circuit is maintained until the sequence switch is rotated into position 17, in a manner which will be described. The relay 551, upon operating, at armature 557 completes a circuit for the contactor C. This contactor or circuit breaker operates in conjunction with other apparatus (not shown) to start the rotary converter RC.

When the sequence switch is in position 5, a circuit is completed extending from battery by way of sequence switch contact 508 and winding of slow-acting relay 504 to ground. This relay is energized and operates to disconnect ground from one contact associated with the sequence switch contact 510. When the sequence switch is in position 6, a circuit is completed by way of the sequence switch contact 508 for the relay 505.

Upon the deenergization of the slow-acting relay 504, which occurs shortly after the movement of the sequence switch from position 5 to position 6, a circuit is completed extending from ground by way of armature 506, and its back contact, sequence switch contact 510 in its sixth position and winding of sequence switch 500 to battery. The sequence switch magnet is operated over the above circuit and this sequence switch is moved to position 7, by which operation the circuit of the relay 505 is opened and the circuit for the relay 504 is completed. The slow-releasing relay 505, upon being deenergized, completes another circuit for the sequence switch magnet, whereupon the sequence switch is moved from position 7 to position 8. This operation continues, the sequence switch magnet 500 being intermittently energized to rotate the sequence switch to position 18, whereupon the relays 504 and 505 cease to function.

In position 18 of the sequence switch, a circuit is completed extending from ground by way of the sequence switch contact 515 and winding of down-drive magnet 526 to battery. The down-drive magnet 526 operates to bring the shaft 541 into contact with the down-drive roll 532, whereby the downward motion of the wiper carrying shaft 541 occurs. By the operation of the sequence switch contact 583, the original energizing circuit of the relay 551 is opened. This relay does not deenergize, by reason of the fact that a locking circuit has been established for itself at armature 552.

In position 18 of the sequence switch, the contact 512 is closed and a circuit is completed for the trip magnet 525. The purpose of this operation is to so restore the particular brush which has been tripped that, upon the subsequent operation of the connector H, the proper brush may be selected.

When the shaft 541 reaches its normal position, a circuit is completed extending from ground by way of commutator brush 585, commutator segment 599, armature 596 and its front contact and winding of relay 597 to battery. The operation of the relay 597 opens the circuit of the down-drive magnet 526, whereby the downward movement of the switch ceases.

It will be remembered that the operation of the armature 177 of the relay 171 short-circuits the impulsing contact 136 so that subsequent operation of the repeating relay 122 is without particular function. The rotation of the switch wipers 160 to 163, inclusive, of the code-sending switch CD, however, continues under the control of the slow-acting relay 121 until the said switch wipers are brought into engagement with their twenty-fifth set of bank contacts. By the operation of the wiper 160, the circuit of the slow-releasing relay 115 is opened and this relay is deenergized to open the circuit of the slow-releasing relay 118 at armature 125, and at armature 178 to open the locking circuits of the relays 170 and 171, whereby these relays are deenergized. Another result of the retraction of the armature of the relay 115 is that the circuit of the line relay at the substation is opened at armature 136 by reason of the deenergization of the relay 122, and at armature 124, a circuit is momentarily completed for the motor magnet 141 of the finder switch F. As the motor magnet interrupts its own circuit, the wipers 146 to 148, inclusive, are advanced a certain number of steps.

The slow-releasing relay 118 is deenergized after an interval of time, thereby opening the circuit of the slow-releasing relay 119 at armature 131 to complete a circuit at armature 130, extending from ground by way of said armature and its back contact, winding of magnet 139, armature 132 and its back contact, bank contact and wiper 163, and armature 140 and its back contact to battery. The motor magnet 139 operates to restore the wipers 160 to 163, inclusive, to their normal positions.

The slow-releasing relay 119 is deenergized after an interval of time, as is the slow-releasing relay 120. By the movement of the wiper 160 to its normal position, the circuit of the relay 116 is opened and this relay is deenergized to open the circuit of the motor magnet 141 which ceases to operate. At the substation, the deenergization of the line relay opens the circuit of the relay 590 at armature 217. This relay is deenergized and, at armature 596, completes a circuit extending from ground by way of the commutator brush 585, commutator segment 599, armature 596 and its back contact, sequence switch contact 516 and winding of sequence switch magnet 500 to battery. The sequence switch now moves to normal position.

When the sequence switch moves from position 17, the circuits of the various counting relays of Figs. 2 and 3 are opened at the sequence switch contact 517, whereby the deenergization of these relays is secured.

In the above-described manner, the apparatus is released responsive to the transmission of the desired code from the substation.

Attention is drawn to the fact that the relay 102 is not released by such code-sending operation, the reason being that the code may not have been properly transmitted, and the code-sending operation will reoccur until the desired answer-back code is obtained which, as will be subsequently described, will release the relay 102.

In a similar manner each of the other keys such as key K energizes relays such as relay 102 which have in turn armatures 104 connected over conductors to positions on the selector of wiper 148, equivalent to contact 152 so that the switches 146 and 148 are brought to a stop at a different position than that described above due to the face that an energizing circuit is completed for the relay 117 in a different position of the switches. Inasmuch as the code which is transmitted is determined by the position of the switches 146 to 148 as described above, a different code is transmitted for each switch such as K which operates.

When the contactor C is in its normal position and the relay 562 is deenergized, a circuit is completed for the relay 560 which locks itself energized at armature 563 and, at armatures 564 and 565, prepares certain circuits. When the contactor is closed, as above described, the relay 562 is energized and, as a result thereof, the original energizing circuit of the relay 560 is opened and a circuit is completed for the relay 561. The relay 561, upon energizing, at armature 567, completes a circuit extending from ground by way of said armature and its front contact, front contact and armature 564, conductor 572, back contact and armature 621, winding of stepping magnet 612, and back contact and armature 627 to battery.

As the motor or actuating magnet 612 interrupts its own circuit, it operates as a buzzer over the above circuit to advance wipers 640 to 643, inclusive, until these wipers are brought into engagement with the bank contact set comprising the bank contacts 644 to 647, inclusive. When this occurs, a circuit is completed extending from ground by way of the wiper 643, bank contact 647, conductor 576, armature 568 and its front contact, front contact and armature 565, conductor 573 and winding of the relay 605 to battery.

The relay 605 is energized over the above circuit and operates, at armature 627, to open the previously traced circuit for the motor magnet 612; at armature 628 completes a circuit extending from ground by way of the wiper 650 and its associated bank contact, armature 618 and its back contact, armature 628 and its front contact and winding of slow-releasing relay 604 to battery, and at armature 626 completes a circuit extending from ground by way of said armature and its front contact, winding of slow-acting relay 608 and back contact and armature 637 to battery. The slow-releasing relay 608 operates, at armature 634, to prepare a circuit for the motor magnet 611.

The relay 604 is energized over the above circuit and operates, at armature 624, to complete a circuit extending from ground by way of armature 626 and its front contact, winding of relay 600, armature 624 and its front contact and back contact and armature 637 to battery. The relay 600 is energized over the above circuit and operates, at armature 615, to complete a circuit for the line relay 706 at the dispatcher's office over the trunk line conductors 660 and 661.

Another result of the operation of the relay 604 is that a circuit is completed for the relay 607. This relay, upon operating, at armatures 632 and 633, opens certain points in the circuit of the stepping magnet 611, and at armature 631 completes a circuit for the slow-acting relay 610. The latter relay, upon operating, at armature 636, completes a circuit for the slow-releasing relay 609. Upon the energization of the latter relay, a circuit is completed extending from ground by way of armature 620 and its back contact, front contact and armature 635, front contact and armature 634, winding of stepping magnet 611, wiper 652 and its associated bank contacts, and armature 631 and its front contact to battery.

The stepping magnet 611 is energized over the above circuit and operates, at armature 637, to open the circuit of the magnet 608 and also the circuit of the repeating relay 600.

In addition, the energization of the magnet 611 operates to place the actuating pawl in such position as to turn the switch shaft carrying the wipers 650 to 653, inclusive, upon its deenergization.

At the dispatcher's office, the energization of the line relay 706 causes a circuit to be completed which extends from ground by way of the front contact and armature 737, conductor 760, conductor 860, sequence switch contact 1004 in its first position and winding of sequence switch magnet 1000 to battery. The sequence switch magnet 1000 is energized over the above-traced circuit and it operates to cause the sequence switch to be rotated to its second position.

At the substation, the slow-releasing relay 608 is deenergized after an interval of time to open the circuit of the stepping magnet 611, which retracts its armature to complete the circuits of the relays 608 and 600 and to advance the switch shaft, carrying the switch wipers 650 to 653, inclusive, into engagement with their first off-normal set of bank contacts.

The repeating relay 600 energizes to again close the circuit of the line relay 706 at the dispatcher's office. The relay 608 operates to again close the circuit of the stepping magnet 611. This intermittent action of the relays 600 and 608 and the magnet 611 continues until the switch wipers 650 to 653, inclusive, are brought into engagement with the bank contact set which includes the bank contact 670. By this operation, a circuit is completed extending from ground by way of armature 567 and its front contact, front contact and armature 564, conductor 572, wiper 642, bank contact 646, bank contact 670, wiper 651, and winding of relay 602 to battery.

Upon operating, the relay 602, at armature 620, opens the circuit of the stepping magnet 611, at the front contact of this armature prepares another circuit for the said stepping magnet, and at armature 638 completes a circuit for the upper winding of relay 675. With its upper winding energized, the relay 675 operates to prepare a circuit, at armature 678, for its lower winding. The armature 677 of the relay is not attracted at this time because of the peculiar construction of the relay which is similar to that of the relays 170 and 171, previously described.

The slow-acting relay 610 is deenergized after an interval of time to open the circuit of the slow-releasing relay 609 which is also deenergized. By the deenergization of the relay 609, a circuit is completed extending from ground by way of armature 620 and its front contact, back contact and armature 635, front contact and armature 634, winding of stepping magnet 611, wiper 652, bank contact with which said wiper is in engagement and armature 631 and its front contact to battery.

The magnet 611 operates over the above-traced circuit to open the circuits of the relays 600 to 608, inclusive.

The relay 600 operates to open the circuit of the line relay 706 at the dispatcher's office, while the relay 608 operates to open the circuit of the magnet 611, which is deenergized. The magnet 611 deenergizes to advance the switch wipers into engagement with the next set of bank contacts and to complete a circuit for the relays 608 and 600.

By the movement of the switch wiper 651, the circuit of the relay 602 is opened and this relay deenergizes to open the circuit of the stepping magnet 611 at armature 620, to prepare another circuit for the said magnet at the back contact of this armature, to remove the short-circuit from the lower winding of relay 675 at armature 638, and to again close the circuit of the slow-releasing relay 610 at armature 619. The relay 675 immediately operates, at armature 677, to prepare a circuit for the upper winding of the relay 676.

Referring now to the apparatus at the dispatcher's office, each time the repeating relay 600 deenergizes, the relay 706 releases its armatures. In this case, as three interruptions were produced in the circuit of the line relay 706, the armatures of this relay were retracted three times. Upon the first retraction of the armature 738, a circuit is completed extending from ground by way of said armature and its back contact, winding of relay 705, conductor 763, and armature 834 and its back contact to battery. The slow-releasing relay 705 is energized over the above circuit and operates, at its armature 735, to prepare a circuit for the upper winding of the relay 704.

Upon the next energization of the relay 706, a circuit is completed extending from ground by way of the armature 738 and its front contact, armature 735 and its front contact, armature 731 and its back contact, upper winding of the relay 704, conductor 765, conductor 865, and thence to battery by way of the sequence switch contact 1007, which is closed in position 2 of the sequence switch. With its upper winding energized, the relay 704 only attracts the armature 732. As a result of the latter operation, a circuit is completed for the lower winding of the said relay from ground through battery sequence switch contact 1007, conductor 865 and 765, the upper and lower windings of relay 704, front contact and armature 732 to ground. This circuit is not effective at the present time, by reason of the fact that it is shunted so long as the armature 738 remains in an attracted position.

Upon the next deenergization of the relay 706, the relay 704 is completely energized.

In a like manner, by the successive operation of the line relay 706, the relay 703 is operated and a circuit is closed for the upper winding of the relay 702. When the circuit is closed for the relay 702, the relay 706 is maintained energized during the operation of the slow-releasing relays 609 and 610 at the substation. This continued energization of the relay 706 causes the slow-releasing relay 705 to retract its armatures, whereby the short-circuit is removed from the lower winding of the relay 702 and this relay is permitted to operate completely.

By the deenergization of the relay 705, a circuit is completed extending from ground by way of the back contact and armature 721, conductor 769, conductor 870, sequence switch contact 1009, which is closed in position 2 of the sequence switch, winding of relay 1020, sequence switch contact 1010 and winding of relay 1019 to battery. The relay 1019 is energized over the above-traced circuit and operates, at armature 1022, to close a circuit for the up-drive magnet 1026 of the connector H—1 and to prepare a circuit for shunting the relay 1020 at armature 1021. The relay 1020 is also energized over the above-traced circuit and operates, at armature 1023, to complete a circuit extending from ground by way of said armature and its front contact, sequence switch contact 1091, conductor 868, conductor 767, armature 734 and its back contact, armature 730 and its front contact, armature 727 and its front contact, armature 724 and its front contact, armature 720 and its back contact, armature 744 and its back contact, winding of relay 711, conductor 765, conductor 865 and sequence switch contact 1007 to battery.

The relay 711 is energized over the above-traced circuit and operates, at armature 743, to prepare a circuit for the relay 712 from battery through the winding of relay 711 traced above, the winding of relay 712 and ground. However, this circuit is ineffective at this time, inasmuch as the relay 712 is shunted out so long as the relay 1020 remains energized.

The switch shaft 1033, carrying the wipers 1034 to 1038, inclusive, continues to move up under the influence of the up-drive roll 1030. As the switch shaft moves up, the commutator brush 1040 engages a conducting segment which causes the relay 1020 to be shunted, and this relay is deenergized. As a result of this operation, the relay 712 is energized and a circuit is prepared for the relay 713. When the commutator brush engages an insulating segment, relay 1020 is permitted to energize and the relay 713 is energized. Upon the brush 1040 engaging the next conducting segment, the relay 1020 is deenergized and the relay 714 is energized. In a like manner, the upward movement of the brush 1040 causes the relays 715 and 716 to be energized.

The relay 716, upon being energized, at armature 750 completes a circuit extending from ground by way of the front contact and said armature, conductor 768, conductor 869, sequence switch contact 1004 and winding of sequence switch magnet 1000 to battery. The sequence switch magnet is energized over the above circuit and operates to cause the sequence switch to rotate from its second position to its third position. The sequence switch continues to rotate into position 4 under control of the sequence switch contact 1005. As soon as the sequence switch moves from position 2, the circuits of the relays 1019 and 1020 are opened at the sequence switch contacts 1009 and 1010. The deenergization of the relay 1019 opens the circuit of the up-drive magnet 1026. When the sequence switch passes through position 3¾ of sequence switch contact 1008, the trip magnet 1024 is operated to trip the selected brush, which, it will be assumed, is the brush 1038.

Another result of the energization of the relay 716 is that a circuit is opened for the relay 715.

Returning now to the operation of the code-sending switch CD—1 at the substation, the rotation of the switch wipers 650 to 653, inclusive, continues under the control of the slow-releasing relay 608 until the said wipers are brought into engagement with the bank contact set which includes the bank contact 671. The relay 600, of course, is deenergized upon each operation of the magnet 611 and serves to interrupt the circuit of the line relay 706. Inasmuch as the stepping magnet 611 operates three times to advance the wipers into engagement with the bank contact set which includes the bank contact 671, the relay 600 is deenergized and energized three times.

When the switch wipers engage this set of bank contacts, the relay 602 is energized and operates, as before, to interrupt the circuit of the stepping magnet 611 until the slow-releasing relays 610 and 609 are deenergized, whereupon the stepping circuit is reestablished and the relay 602 is deenergized.

The energization and deenergization of the relay 602 causes the complete operation of the relay 676, whereby at armature 681 which operates on the initial energization of the relay 671, the contacts 615 on the repeating relay 600 are short-circuited so that further operation of this relay is not effective to open the circuit of the line relay 706 at the dispatcher's office.

The interruptions produced in the circuit of the line relay 706 cause a corresponding number of impulses to be sent over a path extending from ground by way of armature 738 and its back contact, armature 736 and its back contact, front contact and armature 733, conductor 762 and winding of slow-releasing relay 805 to battery. It will be noted that, at the same time, a circuit is completed through the winding of the slow-releasing relay 705. However, by reason of the fact that the relay 805 is adjusted to operate before the relay 705, the circuit of the relay 805 is effective at this time. The relay 805, upon being energized, opens the circuit of the relay 705 at armature 834, and at armature 833 prepares the impulsing circuit of the counting relays.

Upon the next energization of the relay 706, a circuit is completed for the upper winding of the relay 804. When the relay 706 is again deenergized, the relay 804 is completely operated. In a like manner, the relay 803 is completely energized. When the pause occurs in the impulsing by the operation of the code-sending switch CD—1, the line relay 706 is maintained energized and a circuit is maintained closed for the upper winding of the relay 802.

As the circuit of the relay 805 is maintained opened, this relay is deenergized and a circuit is completed extending from ground by way of the back contact and armature 835, conductor 867, sequence switch contact 1009, winding of relay 1020, sequence switch contact 1010 and winding of relay 1019 to battery. The relays 1019 and 1020 are energized over the above circuit.

The relay 1019, upon operating, at armature 1022, closes a circuit for the up-drive magnet 1026, and at armature 1021 prepares a circuit for shunting the relay 1020. The relay 1020, upon being energized, completes a circuit extending from ground by way of armature 1023 and its front contact, sequence switch contact 1091, conductor 871, armature 822 and its back contact, armature 828 and its front contact, armature 825 and its front contact, armature 822 and its front contact, armature 819 and its back contact, armature 841 and its back contact, winding of relay 810, conductor 865 and sequence switch contact 1007 to battery. The relay 810 is energized over the above circuit and operates, at armature 840, to prepare a circuit for the relay 811.

During the upward movement of the switch shaft, the commutator brush 1040 operates to intermittently shunt the relay 1020. In the manner described in conjunction with the operation of the connector H, the relays 811 to 815, inclusive, are operated. Upon the operation of the relay 815, a circuit is completed extending from ground by way of armature 846 and its front contact, conductor 866, sequence switch contact 1004 and winding of sequence switch magnet 1000 to battery. The sequence switch magnet is energized to cause the sequence switch to be moved out of position 4 and into position 6 under control of the sequence switch contact 1005.

When the sequence switch is brought into its fifth position, a circuit is completed for the slow-acting relay 1016, which is operated. By the movement of the sequence switch to position 6, the circuit of the relay 1016 is opened and the relay is deenergized after an interval, and a circuit is completed for the sequence switch magnet 1000, whereby the sequence switch is brought into position 7. In this position, the circuit of the relay 1015, which had been previously closed, is opened and a circuit is completed for the relay 1016. The deenergization of the relay 1015 completes a circuit for the sequence switch magnet 1000, whereby the sequence switch is brought to position 8. This operation continues until the sequence switch is brought into position 18.

As soon as the sequence switch passes from its fourth position, the circuit of the up-drive magnet 1026 is opened and upward movement of the switch shaft ceases. The brush 1038 is thus brought into engagement with its proper bank contact set which is determined by the number of interruptions produced in the circuit of the line relay 705. It will be assumed that this bank contact is the bank contact 1095. When the sequence switch spring 1090 is in positions 4¾ to 17, a circuit is completed extending from battery by way of said spring 1090, commutator brush 1041, brush 1038, bank contact 1095, and winding of relay 1057 to battery. The relay 1057 operates to shunt the relay 1051, whereupon this relay is deenergized to complete a circuit for the supervisory lamp 1054 and to open the circuit of the lamp 1055. By the operation of the relay 1051, the circuit of the relay 102 is also opened, this relay is deenergized, and the operation of the code-sending switch CD at the dispatcher's office ceases.

The release of the connector H—1 and the associated counting relays takes place in a manner already described in conjunction with the release of the connector H and its associated counting relays.

The above is the operation of the system when the dispatcher desires to operate a certain circuit breaker, or other apparatus unit, at the substation. However, it is quite possible that various apparatus units at the substation may also be under the control of automatic devices, which are well known, and which function in accordance with circuit conditions in the power equipment to operate the apparatus units.

Referring now to the apparatus at the substation, the code-sending switch CD and the finder switch F release in a manner similar to that already described in connection with the release of the finder switch F and code-sending switch CD at the dispatcher's office.

It will be assumed that the contactor C at the substation is operated under automatic control. In this instance the code-sending operation, whereby the connector switch H—1 is operated, takes place in identically the same manner as that described.

My invention is not limited to the particular arrangement of the apparatus illustrated but may be variously modified without departing from the spirit and scope of my invention, as set forth in the appended claim.

I claim as my invention:

In a supervisory control system, a first station, a second station, apparatus units at said second station, a plurality of controlling devices, individual to said apparatus units at said first station, an automatic switch at said second station comprising a plurality of wipers and a group of contacts for each set of wipers, each of said contacts being individual to and connected to one of said apparatus units, means for causing said switch to move one of said wipers into engagement with a predetermined bank contact, said means including said individual device, means following said movement for operating the apparatus unit associated with said contact and means whereby said device reoperates said automatic switch until the correct apparatus unit operates.

In testimony whereof, I have hereunto subscribed my name this 26th day of February, 1924.

JAMES L. McCOY.